US009184777B2

(12) United States Patent
Esselink et al.

(10) Patent No.: US 9,184,777 B2
(45) Date of Patent: Nov. 10, 2015

(54) METHOD AND SYSTEM FOR PERSONALIZED DEALERSHIP CUSTOMER SERVICE

(71) Applicant: Ford Global Technologies, LLC, Dearborn, MI (US)

(72) Inventors: Chad Evert Esselink, Canton, MI (US); Chad Christopher Boes, Plymouth, MI (US); Jeffrey Lee Hentschel, Novi, MI (US); Jayanthi Rao, West Bloomfield, MI (US); Andrew Shaffer, Bloomfield Village, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 193 days.

(21) Appl. No.: 13/767,469

(22) Filed: Feb. 14, 2013

(65) Prior Publication Data

US 2014/0227980 A1 Aug. 14, 2014

(51) Int. Cl.
*G01M 17/00* (2006.01)
*G06F 7/00* (2006.01)
(Continued)

(52) U.S. Cl.
CPC .......... *H04B 1/3822* (2013.01); *G06Q 10/0631* (2013.01); *G07C 5/00* (2013.01)

(58) Field of Classification Search
CPC ... H04B 1/3822; H04M 1/6091; H07C 5/008; H07C 9/00007; H07C 9/00103; G07C 5/008; G07C 5/0808
USPC ............. 455/67.11, 152.1, 569.2, 409, 414.1, 455/418, 423, 41.1–41.2, 345; 701/2, 29.6, 701/31.4, 31.5, 33.2, 29.1, 31.6, 32.3, 431
See application file for complete search history.

(56) References Cited

U.S. PATENT DOCUMENTS 5,781,125 A 7/1998 Godau et al.
5,922,041 A 7/1999 Anderson
(Continued)

FOREIGN PATENT DOCUMENTS

EP 0808492 B1 8/1996
JP 9264819 10/1997
(Continued)

OTHER PUBLICATIONS

"Drew Tech gets you on the Bus", article printed from www.drewtech.com, Dec. 16, 2009.
(Continued)

*Primary Examiner* — Simon Nguyen
(74) *Attorney, Agent, or Firm* — Jennifer M. Stec; Brooks Kushman P.C.

(57) ABSTRACT

A vehicle computing system enables one or more processers to communicate with a service center and present service instructions to an output device at the vehicle. The output device presenting information may include, but is not limited to, a vehicle occupant's cell phone device. The vehicle computing system may include a wireless transceiver for communicating wireless signals to and from the vehicle computing system. The vehicle computing system may establish wireless communication with a service center communication system through the transceiver and transmit vehicle identification to the service center communication system. The vehicle computing system may receive data from the service center communication system including service instructions in response to the vehicle identification transmission, and present the service instructions on the output device.

17 Claims, 5 Drawing Sheets

(51) Int. Cl.
*G06F 19/00* (2011.01)
*H04B 1/3822* (2015.01)
*G06Q 10/06* (2012.01)
*G07C 5/00* (2006.01)

(56) References Cited

U.S. PATENT DOCUMENTS

| | | | |
|---|---|---|---|
| 6,064,322 A | 5/2000 | Ohira | |
| 6,337,621 B1 | 1/2002 | Ogino et al. | |
| 6,356,839 B1 | 3/2002 | Monde et al. | |
| 6,434,455 B1 | 8/2002 | Snow et al. | |
| 6,553,292 B2 | 4/2003 | Kokes et al. | |
| 6,598,183 B1 | 7/2003 | Grieco et al. | |
| 6,603,394 B2 | 8/2003 | Raichle et al. | |
| 6,611,740 B2 | 8/2003 | Lowrey et al. | |
| 6,611,755 B1 | 8/2003 | Coffee et al. | |
| 6,636,790 B1 | 10/2003 | Lightner et al. | |
| 6,687,587 B2 | 2/2004 | Kacel | |
| 6,738,697 B2 | 5/2004 | Breed | |
| 6,778,888 B2 | 8/2004 | Cataldo et al. | |
| 6,978,198 B2 | 12/2005 | Shi | |
| 7,146,307 B2 | 12/2006 | Mocek | |
| 7,155,321 B2 | 12/2006 | Bromley et al. | |
| 7,209,490 B2 | 4/2007 | Isaac et al. | |
| 7,228,211 B1 | 6/2007 | Lowrey et al. | |
| 7,232,962 B2 | 6/2007 | Rynd | |
| 7,277,780 B2 | 10/2007 | Meier-Arendt et al. | |
| 7,340,365 B2 | 3/2008 | Wubbena et al. | |
| 7,343,526 B2 | 3/2008 | Aditham | |
| 7,356,394 B2 | 4/2008 | Burgess | |
| 7,366,934 B1 | 4/2008 | Narayan et al. | |
| 7,379,541 B2 | 5/2008 | Iggulden et al. | |
| 7,487,074 B2 | 2/2009 | Ohtsu et al. | |
| 7,493,209 B1 | 2/2009 | Altrichter et al. | |
| 7,522,995 B2 | 4/2009 | Nortrup | |
| 7,532,962 B1 | 5/2009 | Lowrey et al. | |
| 7,590,476 B2 | 9/2009 | Shumate | |
| 7,905,815 B2 | 3/2011 | Ellis et al. | |
| 7,983,839 B2 | 7/2011 | Sutardja | |
| 8,024,111 B1 | 9/2011 | Meadows et al. | |
| 8,103,443 B2 | 1/2012 | Kantarjiev et al. | |
| 8,126,644 B2 | 2/2012 | Amano | |
| 8,140,358 B1 | 3/2012 | Ling et al. | |
| 8,185,299 B2 | 5/2012 | Fujiwara et al. | |
| 8,219,249 B2 | 7/2012 | Harrod et al. | |
| 8,285,439 B2 | 10/2012 | Hodges | |
| 8,315,802 B2 | 11/2012 | Brown | |
| 8,364,402 B2 | 1/2013 | Ross et al. | |
| 8,390,473 B2 | 3/2013 | Krzyzanowski et al. | |
| 8,392,105 B2 | 3/2013 | Desborough | |
| 2002/0035429 A1 | 3/2002 | Banas | |
| 2002/0173885 A1 | 11/2002 | Lowrey et al. | |
| 2002/0186144 A1* | 12/2002 | Meunier | 340/825.28 |
| 2003/0034769 A1 | 2/2003 | Lipscomb et al. | |
| 2003/0036832 A1 | 2/2003 | Kokes et al. | |
| 2003/0163587 A1 | 8/2003 | Knight et al. | |
| 2004/0024502 A1 | 2/2004 | Squires et al. | |
| 2004/0044454 A1 | 3/2004 | Ross et al. | |
| 2004/0054503 A1 | 3/2004 | Namaky | |
| 2004/0093134 A1 | 5/2004 | Barber et al. | |
| 2004/0128071 A1 | 7/2004 | Schradi | |
| 2004/0172177 A1 | 9/2004 | Nagai et al. | |
| 2004/0194479 A1 | 10/2004 | Umebayashi et al. | |
| 2004/0218894 A1 | 11/2004 | Harville et al. | |
| 2005/0090939 A1 | 4/2005 | Mills et al. | |
| 2005/0096020 A1 | 5/2005 | Oesterling | |
| 2005/0097541 A1 | 5/2005 | Holland | |
| 2005/0192724 A1 | 9/2005 | Hendry | |
| 2005/0281414 A1 | 12/2005 | Simon et al. | |
| 2006/0034231 A1 | 2/2006 | Tailor | |
| 2006/0041348 A1 | 2/2006 | Liebl et al. | |
| 2006/0130033 A1 | 6/2006 | Stoffels et al. | |
| 2006/0132291 A1 | 6/2006 | Dourney, Jr. et al. | |
| 2006/0155437 A1 | 7/2006 | Wang et al. | |
| 2006/0229777 A1 | 10/2006 | Hudson et al. | |
| 2006/0253235 A1 | 11/2006 | Bi et al. | |
| 2007/0093215 A1* | 4/2007 | Mervine | 455/99 |
| 2007/0121959 A1 | 5/2007 | Philipp | |
| 2007/0162796 A1 | 7/2007 | Chan et al. | |
| 2007/0171029 A1 | 7/2007 | Inbarajan | |
| 2007/0179799 A1 | 8/2007 | Laghrari | |
| 2008/0015748 A1 | 1/2008 | Nagy | |
| 2008/0027605 A1 | 1/2008 | Oesterling | |
| 2008/0027606 A1 | 1/2008 | Helm | |
| 2008/0082226 A1 | 4/2008 | Amador et al. | |
| 2008/0140281 A1 | 6/2008 | Morris et al. | |
| 2008/0147267 A1 | 6/2008 | Plante et al. | |
| 2008/0162033 A1 | 7/2008 | Wagner et al. | |
| 2008/0167056 A1 | 7/2008 | Gilzean et al. | |
| 2008/0167078 A1 | 7/2008 | Eibye | |
| 2008/0172357 A1 | 7/2008 | Rechis et al. | |
| 2008/0216067 A1 | 9/2008 | Viling | |
| 2008/0269975 A1 | 10/2008 | Bertosa et al. | |
| 2009/0063038 A1 | 3/2009 | Shrivathsan et al. | |
| 2009/0063045 A1 | 3/2009 | Figueroa et al. | |
| 2009/0069040 A1* | 3/2009 | Wiesmuller et al. | 455/466 |
| 2009/0143937 A1 | 6/2009 | Craig | |
| 2009/0177352 A1 | 7/2009 | Grau et al. | |
| 2009/0177506 A1 | 7/2009 | Jiang | |
| 2009/0210145 A1 | 8/2009 | Amano | |
| 2009/0228170 A1* | 9/2009 | Taki | 701/33 |
| 2009/0276115 A1 | 11/2009 | Chen | |
| 2009/0292416 A1 | 11/2009 | Ubik et al. | |
| 2009/0308134 A1 | 12/2009 | Pepper | |
| 2009/0326757 A1 | 12/2009 | Andreasen et al. | |
| 2009/0326949 A1 | 12/2009 | Douthitt et al. | |
| 2009/0326991 A1 | 12/2009 | Wei et al. | |
| 2010/0042287 A1 | 2/2010 | Zhang et al. | |
| 2010/0042288 A1 | 2/2010 | Lipscomb et al. | |
| 2010/0556055 | 3/2010 | Ketari | |
| 2010/0082559 A1 | 4/2010 | Sumcad et al. | |
| 2010/0204878 A1 | 8/2010 | Drew et al. | |
| 2010/0245123 A1 | 9/2010 | Prasad et al. | |
| 2010/0246846 A1 | 9/2010 | Burge et al. | |
| 2010/0256861 A1 | 10/2010 | Hodges | |
| 2010/0262335 A1 | 10/2010 | Brozovich | |
| 2011/0022422 A1 | 1/2011 | Taylor | |
| 2011/0041088 A1 | 2/2011 | Mason et al. | |
| 2011/0046883 A1 | 2/2011 | Ross et al. | |
| 2011/0112969 A1* | 5/2011 | Zaid et al. | 705/50 |
| 2011/0190962 A1 | 8/2011 | Peterson et al. | |
| 2011/0201302 A1 | 8/2011 | Hatton | |
| 2011/0225096 A1 | 9/2011 | Cho et al. | |
| 2011/0258044 A1 | 10/2011 | Kargupta | |
| 2011/0276218 A1 | 11/2011 | Dwan et al. | |
| 2011/0276219 A1 | 11/2011 | Swaminathan et al. | |
| 2012/0029762 A1 | 2/2012 | Ubik et al. | |
| 2012/0030512 A1 | 2/2012 | Wadhwa et al. | |
| 2012/0053782 A1 | 3/2012 | Gwozdek et al. | |
| 2012/0072055 A1 | 3/2012 | Barlsen et al. | |
| 2012/0075092 A1 | 3/2012 | Petite et al. | |
| 2012/0139760 A1* | 6/2012 | Bevacqua et al. | 340/989 |
| 2012/0231821 A1* | 9/2012 | Swanson | 455/466 |
| 2012/0264376 A1 | 10/2012 | Breed | |
| 2012/0294238 A1 | 11/2012 | Uhler | |
| 2013/0317693 A1* | 11/2013 | Jefferies et al. | 701/31.5 |
| 2014/0058616 A1* | 2/2014 | de Oliveira et al. | 701/29.3 |
| 2014/0087769 A1* | 3/2014 | Nath et al. | 455/456.6 |
| 2014/0094210 A1* | 4/2014 | Gellens et al. | 455/517 |
| 2014/0156111 A1* | 6/2014 | Ehrman | 701/2 |
| 2014/0213238 A1* | 7/2014 | Giraud et al. | 455/418 |

FOREIGN PATENT DOCUMENTS

| | | |
|---|---|---|
| JP | 11326140 | 11/1999 |
| JP | 2006018680 | 1/2006 |

OTHER PUBLICATIONS

Kermit Whitfield, "A hitchhiker's guide to the telematics ecosystem", Automotive Design & Production, Oct. 2003, http://findarticles.com, pp. 1-3.

Introduction to J2534 and Flash Reprogramming, Drew Technologies, Copyright 2009.

(56) References Cited

OTHER PUBLICATIONS

Software, Pass Thru Pro II, J2534 Flash Reprogramming, printed from buy1.snapon.com, Dec. 3, 2009.
SYNC Navigation System (Jul. 2007).
SYNC Navigation System (Jul. 2009).
SYNC Navigation System (Oct. 2008).
SYNC Supplemental Guide (Oct. 2008).
SYNC Supplemental Guide (Aug. 2009).
SYNC Supplemental Guide (Nov. 2007).
Dynetics Vehicle Data Rrecorder Models DVG-II and WDVG-II, (www.dynetics-ia.com) Dynetics, Inc., 2009, 2 pages.
Integrated Diagnostic System (IDS), Ford, Lincoln, Mercury, 2013, 6 pages.
Pegisys PC Diagnostic System™, PC-based J2534 Reporogramming & Scan Tool, (www.otctools.com) 2009, 4 pages.
The CarDAQ-Plus Advantage, Drew Technologies, Inc., 2013, 3 pages.

* cited by examiner

METHOD AND SYSTEM FOR PERSONALIZED DEALERSHIP CUSTOMER SERVICE

TECHNICAL FIELD

Embodiments of the present invention generally relates to a method and system for improving the customer service experience with the use of a vehicle computing system wirelessly communicating with a vehicle service center.

BACKGROUND

The following references related to the field of technology and are not believed to disclose the novel concepts of the present invention as disclosed herein.

Patent Application U.S. 2012/0235865 generally discloses a system and method for determining the proximity of a mobile device to a location without the use of a satellite based or other location awareness system. The mobile device monitors radio frequency broadcast identification codes from nearby mobile devices, and determines if the set of detected identification codes is sufficiently similar to a weighted set of identification codes attributed to specified location. If the calculation of similarity meets the confidence conditions of the system, notification is made that the customer or visitor has arrived. The disclosure utilizes a combination of confidence interval computation, machine learning, and fault tolerance mechanisms to optimize the success of correctly detecting that the device is near the relevant location.

Patent Application Publication U.S. 2006/0132291 generally discloses a collection of software scripts, programs and web pages that capture, organize, and store wireless and digital device data and images of customer/lot vehicles for use in vehicle dealerships, service, and repair locations. Reports and views of the collected and organized data may be provided in real-time.

European Patent E.P. 0808492 generally discloses a system for determining an expected time of arrival of a vehicle equipped with a mobile unit. A dispatch is remotely located from the vehicle. The dispatch generates destination information for the vehicle, the destination information specifying at least one destination. The mobile unit includes a mobile communications device to receive the destination information for the vehicle generated by the dispatch. The mobile unit also includes a positioning receiver to determine a vehicle position. In response to the destination information received from the dispatch and the vehicle position, the mobile unit determines the expected time of arrival of the vehicle.

SUMMARY

In a first illustrative embodiment, a vehicle computing system enables one or more processers to communicate with a service center and present service instructions to an output device at the vehicle. The output device presenting information may include, but is not limited to, a vehicle occupant's cell phone device. The vehicle computing system may include a wireless transceiver for communicating wireless signals to and from the vehicle computing system. The vehicle computing system may establish wireless communication with a service center communication system through the transceiver and transmit vehicle identification to the service center communication system. The vehicle computing system may receive data from the service center communication system including service instructions in response to the vehicle identification transmission, and present the service instructions on the output device.

A second illustrative embodiment includes a dealership system for communicating service information to one or more vehicles. The system may include a transceiver configured to wirelessly communicate information between a vehicle computing system and a service center computing system. The service center computing system may receive input defining service instructions corresponding to one or more of a plurality of vehicle identifiers. The service center computing system may receive a present vehicle identifier from the transceiver identifying a vehicle present for service. If the present vehicle identifier is among the plurality of vehicle identifiers, the transceiver may output service instructions corresponding to the present vehicle identifier.

A third embodiment includes a method for receiving vehicle service instructions by establishing wireless communication with a service center communication system through a transceiver. The method includes transmitting vehicle identification to the service center communication system using the transceiver. The method receives data from the service center communication system including service instructions corresponding to the vehicle identification transmission, and presenting the service instructions on an output device at the vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
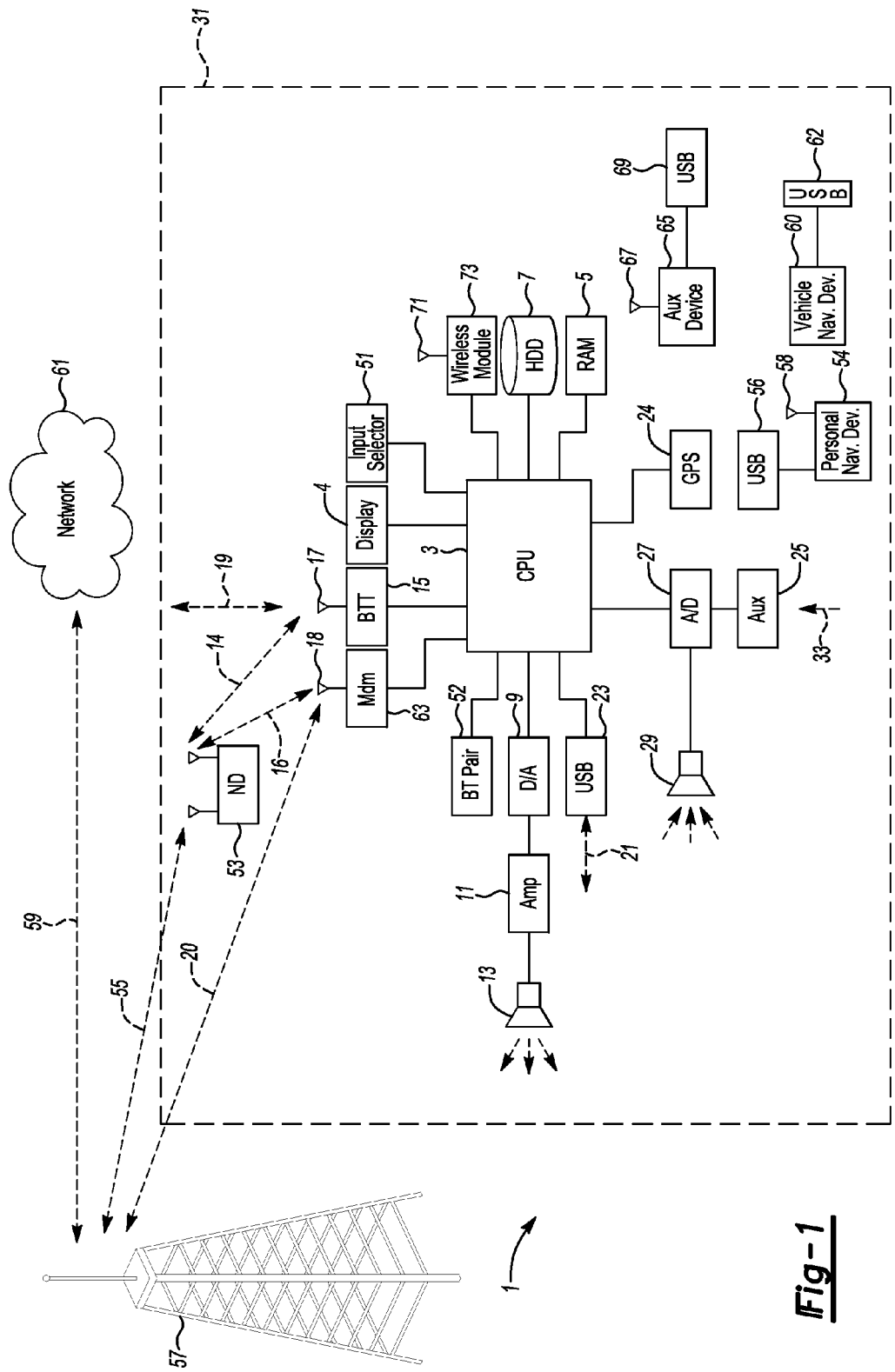
FIG. 1 is an exemplary block topology of a vehicle infotainment system implementing a user-interactive vehicle information display system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
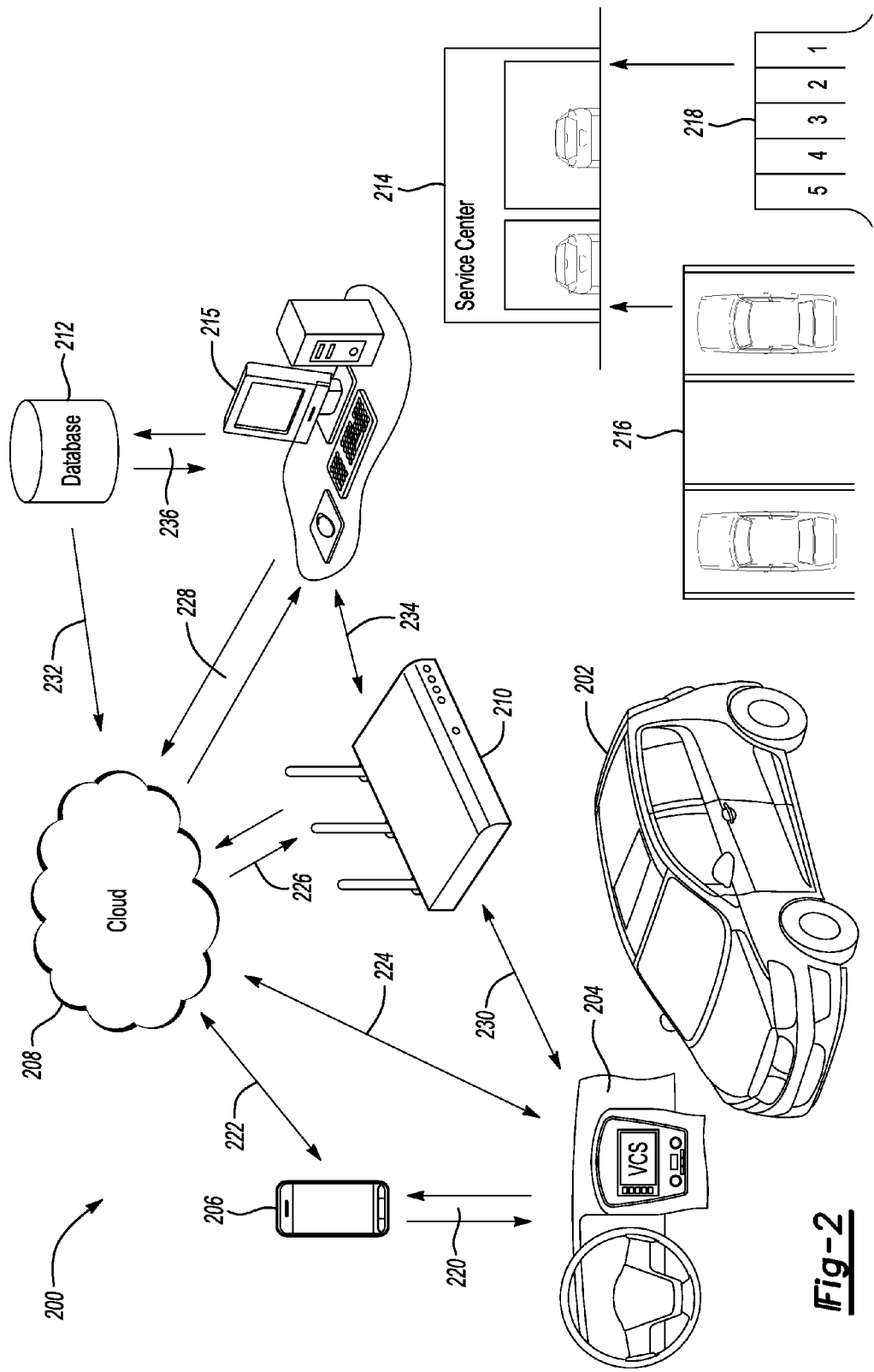
FIG. 2 is an exemplary block topology of a vehicle computing system for communicating with a vehicle service department.

FIG. 2 is an exemplary block topology of a vehicle computing system having one or more processors for communicating with a vehicle service department. The hardware implementation of a dealership service communication system 200 for this embodiment may comprise a VCS 204 including one or more transceivers (not shown) capable of wirelessly communicating 224 and 230 with a router 210 connected 234 to a computer 215 and/or a cloud 208 computing network. The VCS 204 may use a nomadic device 206 to communicate to the router and/or the cloud computing network. The transceiver(s) may include, but is not limited to, an embedded cellular modem, embedded WiFi device, Bluetooth transmitter, Near Field Communication connected to phone, brought-in cellular device like a USB modem, MiFi, smartphone that may be Bluetooth connected 220 to the vehicle through SYNC or other Bluetooth pairing device, or a PC that may be Bluetooth connected 220 to the vehicle through SYNC or other Bluetooth pairing device.

The dealership communication system 200 may contain a database 212 of a plurality of users corresponding to information including, but not limited to, vehicle identification numbers, media access control (MAC) addresses, customer contact information, and other identification codes that may be used to identify a customer's vehicle when wirelessly detected at a service garage. The database may communicate 232 and 236 with a cloud computing network and/or a dealership computer 215. In one embodiment, the vehicle manufacturer may assign the VCS with a MAC address stored in the vehicle system's hardware (i.e. read only memory). The MAC address is associated with the vehicle 202 and this information is stored at the database 212. The MAC address assigned to the VCS may allow the VCS wireless router, for example a WiFi transceiver, to transmit the MAC address for wireless recognition at a manufacture's facility including a service garage, assembly plant or dealership.

In another embodiment wireless information may be passed using the nomadic device 206 via a data-over-voice or data-plan through a Bluetooth transceiver wirelessly recognized by a dealership communication system. The dealership communication system may periodically check for the vehicle by scanning for the registered vehicle Bluetooth or other wireless communication MAC address or identification codes.

Some embodiments of the present invention may allow a customer to drive into a dealership, park next to their loaner vehicle and drive off without waiting in a line or talking with a service writer. In one embodiment, the process begins by a vehicle 202 arriving at a dealership service facility 214 for a maintenance appointment. Once the vehicle 202 arrives at the dealership service facility 214, the VCS 204 wireless router using WiFi may be detected by the dealership router 210.

In one embodiment the dealership computer 215 may use the router 210 to retrieve the vehicles MAC address and compare the vehicle's MAC address with a list of MAC addresses stored in database 212. The dealership computer 215 may communicate 236 with the database to retrieve and/or submit customer information. The list may also include, but is not limited to, vehicle identification numbers, and other identification codes that may be used to identify a customer's vehicle when wirelessly detected at a dealership and/or service department. The list may be stored at a database 212 and/or a cloud 208.

Once the computer 215 receives the registered user list containing MAC address and/or vehicle identification numbers, the computer 215 may verify that the incoming vehicle has a MAC address on the list and grant connectivity to the dealership communication system 200. The vehicle may now be connected to the dealership's WiFi allowing the VCS 204 to begin communication with the dealership's service department 214. In another exemplary embodiment, a router 210 with processing capabilities may communicate 226 with a cloud 208 to perform vehicle recognition and customer identification before granting connectivity to the dealership communication system 200.

The computer 215 may forward the newly connected MAC address to the Cloud 208 for further analysis. The Cloud 208 may determine if the MAC address is associated with a customer vehicle, fleet vehicle, or a loaner vehicle. Once the Cloud 208 determines the vehicle connected to the dealership communication system 200, it may begin to retrieve information related to that vehicle, and generate several messages transmitted to several systems and/or devices including, but not limited to, the VCS 204, customer's handheld mobile device 206, the dealership service department 214, and to a dealership service advisor. It must be noted that the Cloud 208 is not always necessary, further analysis and tasks may be processed at the dealership computer 215.

The service department message transmitted 228 from the Cloud 208 to the dealership service department computer system and/or service advisor communicates to the dealership 214 that the customer has arrived. The service department message may also include, but is not limited to, instructions to the dealership informing the service advisor of the keypad code used to enter the customer's vehicle 202. Additional information may be transmitted to the dealership service advisor including, but not limited to, customer's name, time of appointment, and work scheduled for the customer's vehicle.

The VCS may receive a message transmitted 224 from the Cloud 208 that includes instructions prepared before the customer came in for service. An example of service instructions included in a message transmitted from the Cloud to the VCS may include, but is not limited to, vehicle drop-off directions informing the customer where to park the vehicle 218 and where to pick up the loaner vehicle 216 assigned to that customer. The instructions may also contain additional loaner vehicle information including the keypad code for keyless entry of the customer's assigned loaner vehicle.

In one embodiment, the instructions containing the keypad code for the customer's assigned loaner vehicle allows the customer to gain access to a loaner vehicle without having to interact with a service advisor. Additional information may be transmitted to the customer for allowing keyless entry and/or keyless ignition for the customer's assigned loaner vehicle. This embodiment allows for customer vehicle drop-off at a service garage before or after the service garage business hours of operation.

The messages and instructions transmitted by the Cloud may be encrypted and encoded before being transmitted 224 to the VCS. The VCS may display the encrypted message received from the dealership communication system in several formats including audio over the vehicle speakers, and/or visually on an LCD. The visual communication may be presented to the customer using a projection on the windshield, on a screen located in the instrument panel, and/or on the center stack console. The message and instructions sent by the Cloud may also be transmitted/received 222 at the customer's mobile device.

Figure 3:
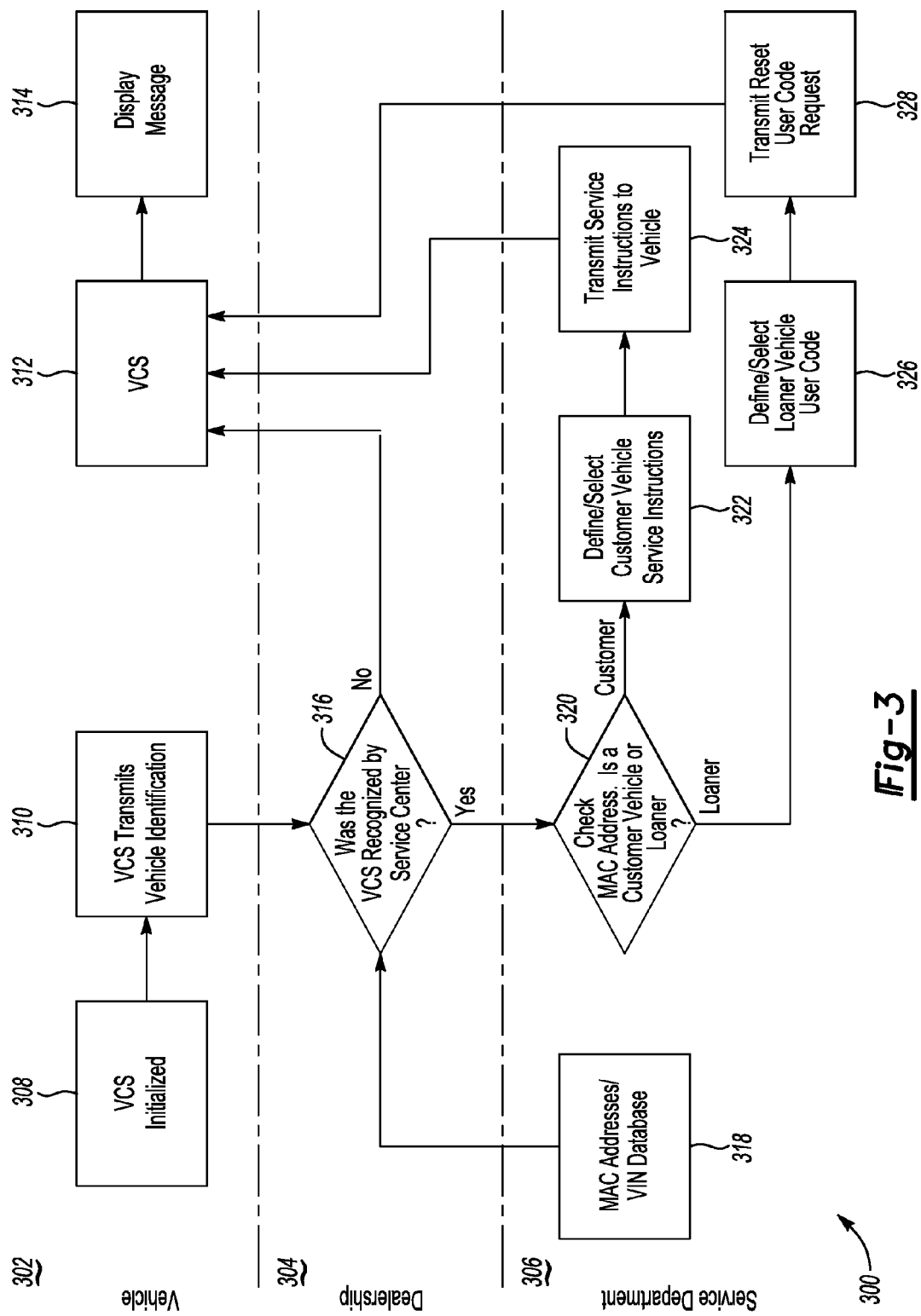
FIG. 3 illustrates the detailed process and data flow separated by the portions of the process implemented by the various components of the system including a vehicle computing system, dealership, and the service department communication system.

FIG. 3 is a flowchart illustrating the detailed process and data flow separated by the portions of the process implemented by the various components of a service recognition system 300 including the vehicle 302, dealership 304, and the service department 306. Multiple users with multiple vehicles may be registered with a dealership communication system. The registration information, including vehicle identification, may be stored on a network database that is linked with the dealership communication system.

At step 308, the initialization of the VCS may include the enablement of the vehicle's communication system and transceiver. For example, once a customer enters and starts their vehicle, the WiFi within the vehicle may be turned on. The vehicle's communication system may include, but is not limited to, an embedded cellular modem, embedded WiFi device, dedicated short-range communication, Bluetooth transmitter, Near Field Communication connected to phone, brought-in cellular device like a USB modem, MiFi, smartphone that may be connected to the vehicle through SYNC or other Bluetooth pairing device, or a PC network that may be connected to the vehicle through SYNC or other Bluetooth pairing device.

The vehicle communication system may be associated with an identifier that may be used to broadcast the identification of a vehicle and/or a customer. At step 310, the VCS may instruct the transmission of the identification codes associated to the vehicle. The dealership 304 may monitor the broadcast identification codes from nearby communication systems and determine if the detected identification codes belongs to a registered vehicle and/or customer at step 316.

In one embodiment the dealership may have a computer connected to a router that detects a WiFi broadcast from a customer's vehicle. In response to the vehicle WiFi broadcast, the computer may automatically compare the vehicle's MAC address to a list of MAC addresses that are allowed to connect to the dealerships communication system. The vehicle MAC address may be assigned by the vehicle manufacturer during assembly. The list of MAC addresses may be stored on a database in communication with the dealership communication system at step 318.

In another embodiment the VCS may implement a dedicated short-range communication system. The dedicated short-range communication system may include, but is not limited to, wireless communication using channels specifically designed for automotive use with a corresponding set of protocols and standards. The dedicated short-range wireless communication may include, but is not limited to, implementation using WiFi technology and/or other dedicated short range communication. If the vehicle is implemented using a dedicated short-range communication system the dealership computer may recognize a generic device/vehicle identifier and/or tag assigned to the vehicle using the dedicated short-range communication system method. The dealership computer may compare the dedicated short-range vehicle identification to a list of identifications that are allowed to connect to the dealership communication system. The dedicated short-range vehicle identification may be assigned by the vehicle manufacture during assembly. The dedicated short-range vehicle identification may be stored on a database in communication with the dealership communication system.

At step 312, if the dealership doesn't recognize the vehicle identification, i.e. the MAC address is not on the list of approved MAC address, than the VCS may receive a refusal message to connect from the dealership communication system. The VCS may generate a display in the vehicle for the received refusal message from the dealership communication system at step 314. The display of the message may include, but is not limited to, an audio message over the vehicle speakers, and/or a visual message on a LCD screen.

If the MAC address is compared and approved to one of the MAC addresses listed in the database, the dealership computer connected to the router may forward the address to a Cloud for further processing and retrieval of service instructions. The Cloud may determine if the MAC address associated with the vehicle identified is for a customer returning a loaner vehicle, or if it is for a customer showing up for their service appointment at step 320.

At step 322, if the vehicle identification is associated with a customer vehicle, then the dealer communication system may define, prepare and/or retrieve service instructions related to the customer vehicle. The Cloud may be used to retrieve the entered service instructions and generate a message for transmission to the VCS. The cloud is not necessary for implementing this process, and a dealership computer may be able to define, prepare, and/or retrieve service instructions related to the identified customer vehicle. Once the dealership communication system has prepared or retrieved the instructions, the system may select and transmit the service instruction to the VCS at step 324.

The customer service instructions may include, but is not limited to, where and/or how to park the vehicle (e.g. parking instructions), overview of scheduled maintenance appointment, pickup replacement vehicle information, and security codes related to entry of the replacement vehicle. The service instructions may be transmitted to the VCS and presented in several forms to the customer in-vehicle or on their mobile device at step 312. The service instructions may be displayed in-vehicle audibly over the speaker and/or visually using the instrument panel or the center console LCD screen at step 314. The dealership communication system may also transmit a message to a service advisor and/or technician notifying that the customer has arrived and is dropping off their vehicle for service.

At step 326, if the vehicle identification is associated with a loaner vehicle, then the dealer communication system may retrieve instructions to reset the vehicle access user code request to the loaner vehicle VCS. The reset user code instructions may be prepared and transmitted by the dealership communication system to the VCS at step 328. The VCS may receive the reset user code and once the loaner vehicle is parked, it may reset the keypad code and/or other security codes that may disallow the customer access to the loaner vehicle once the vehicle is locked at step 312. The VCS may present the reset user code notification to the customer with an in-vehicle display including, but not limited to, audio using vehicle speakers, or visual using an LCD screen at step 314.

Figure 4:
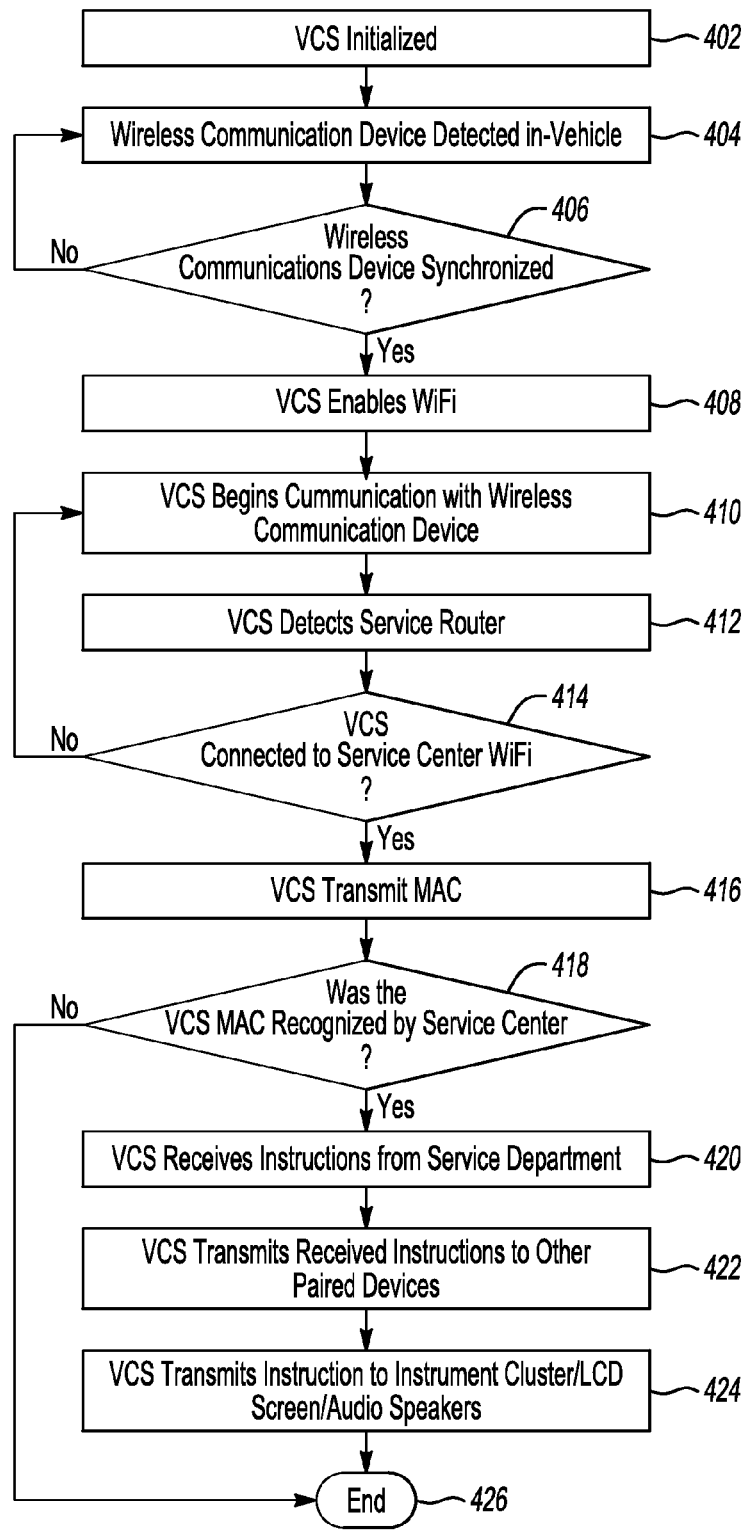
FIG. 4 is a flow diagram illustrating an example process of a vehicle computing system for implementing embodiments of the present invention.

FIG. 4 is a flow diagram illustrating an example process of a vehicle computing system for implementing embodiments of the present invention. In one embodiment, a computer program product (i.e., computer software) having instructions embodied in a computer readable medium may include instructions for performing the operation of the invention according to one of the various embodiments.

The vehicle computing system may be registered with a MAC address by the vehicle manufacturer and stored in the VCS read-only memory. The VCS, including the MAC address, may be registered with a database to ensure enrollment before allowing communication with a service communication system. Once registered and running, the VCS may establish communication with the service communication system. The VCS may establish communication with the service communication system using several wireless technologies including, but not limited to, using a cellular telephone located within a vehicle or in the vehicle vicinity. The VCS may communicate using Bluetooth technology with the wireless phone and wirelessly communicate to the service communication system using the telecommunications network.

At step 402, the VCS may be initialized by the user of the vehicle by a number of examples including, but not limited to, turning the ignition on, using the key fob to wake-up the vehicle modules, and/or using a mobile application. Once the VCS is initialized it may begin communicating with one or more wireless communication devices. For example, the VCS may be initialized once a user enters and starts a vehicle. The VCS may detect a wireless communication device in the vehicle and begin the synchronization process at step 404.

A wireless communication device may include, but is not limited to cell phone, smart phone, PDA, an embedded cellular modem, embedded WiFi device, Bluetooth transmitter, Near Field Communication connected to phone, brought-in cellular device like a USB modem, MiFi, smartphone that may be connected to the vehicle through SYNC or other Bluetooth pairing device, or a PC that may be connected to the vehicle through SYNC or any other device having wireless remote network connectivity. The wireless communication device may be used to communicate with a network outside the vehicle through, for example, communication with a cellular tower. In some embodiments, the tower may be a WiFi access point.

At step 406, the wireless communication device may be synchronized with the VCS. The synchronization of the wireless communication device enables data transmission between the VCS and the service communication system using the wireless communication device. For example, the wireless communication device may be an embedded WiFi device and once the device is synchronized with the VCS, the WiFi may be enabled at step 408. If the wireless communication device fails synchronization, the VCS may continue to detect and request synchronization at step 404.

At step 410, the VCS may begin to communicate with the embedded WiFi device including the transmission of the broadcasting of the MAC address assigned by the manufacture to the VCS and/or embedded WiFi module. If a vehicle arrives at a service center or comes into close proximity of a service communication system, the VCS may detect the service communication system router at step 412.

In one embodiment the customer may manually request communication with a dealer service communication system before being recognized by the service router. A customer may initiate the manual request to the service communication system for service instructions by pressing a button on a specific service application running on the VCS and receive the service instructions assigned to that vehicle from the service communication system.

At step 414, the service communication system may connect to the VCS using WiFi wireless communication. Once detected and connected to the service communication system router, the VCS may identify the vehicle by transmitting through the WiFi device the MAC address assigned to the vehicle at step 416. If the service router is unable to connect or receive the MAC address, the VCS may continue to communicate and transmit WiFi transmissions at step 410.

At step 418, the service router may receive a list of registered vehicles with at least their associated vehicle identification numbers and MAC addresses, and then compare that list to the present vehicle that was detected by the router to determine VCS recognition. If the router confirms the present vehicle MAC address matches one on the list the service communication system may transmit the service instructions associated with that vehicle. The VCS may receive the service instructions from the service department at step 420. If the VCS MAC address is not recognized by the service router, then the service communication system may end communication with the vehicle wireless device at step 426.

At step 422, the VCS may transmit the dealership instructions to other devices paired with the vehicle including, but not limited to a mobile phone. In another example, the service instructions may be sent from the service communication system directly to a handheld mobile device registered with the vehicle. The service instructions may be presented on several systems communicating with a VCS including, but not limited to, an instrument cluster, center console LCD screen and/or over the audio speakers in the vehicle at step 424. Upon the vehicle being dropped off at the service center and the customer disabling the vehicle, the VCS may end communication with the wireless communication device and the service center communication system at step 426.

Figure 5:
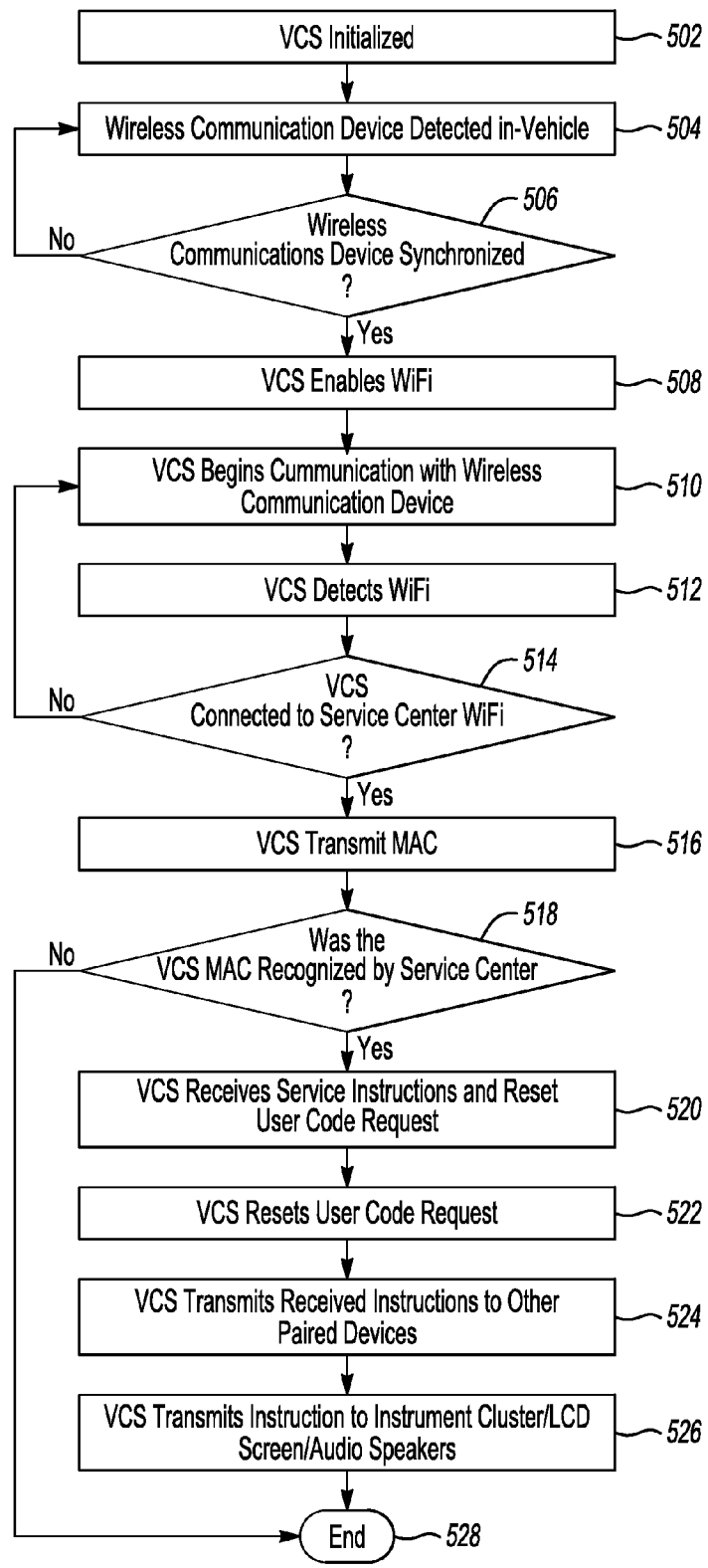
FIG. 5 is a flow diagram illustrating an example process of a vehicle computing system for a loaner vehicle being returned to a dealership service department.

FIG. 5 is a flow diagram illustrating an example process of a vehicle computing system for a loaner vehicle being returned to a dealership service department. Upon a customer dropping off their vehicle for service and/or maintenance, they may receive a loaner vehicle from the service department. If a customer receives notification that their vehicle service is complete, they may proceed to the service department to pick up their vehicle and return the loaner vehicle. In one embodiment, upon return of the loaner vehicle, the service communication system may detect that the loaner vehicle has arrived and transmit instructions to the loaner vehicle VCS. The transmitted loaner vehicle instruction may include, but is not limited to, a task for the VCS to reset the keypad entry code.

At step 502, the VCS may be initialized by a number of inputs including, but not limited to, a vehicle occupant enabling vehicle accessory power. Once the VCS has been enabled, the system may begin to detect wireless communication devices at step 504. The wireless communication devices may include, but is not limited to, an embedded WiFi system. The VCS may recognize previous devices already combined with the system, and/or recognize new devices that may need to be paired with the system. The VCS may recognize a new devices and request the new device to be synchronized with the system.

At step 506, upon detection of a wireless communication device, the VCS may synchronize with the device. For example, the embedded WiFi system may be harmonized with the VCS including synchronization automatically each time the system is initialized. The VCS may enable the WiFi allowing wireless communication using a transceiver at step 508.

At step 510, upon synchronization with the wireless communication device, the VCS may communicate information continuously with the device. Communication between the VCS and the embedded WiFi system may include, but is not limited to, the transmitting and receiving of data. The embedded WiFi device may communicate the detection of the service center communication system WiFi transmission at step 512. The VCS may request to connect to the service center communication system through WiFi communication.

At step 514, the VCS may connect to the service center communication system to determine authorization access. Upon the VCS communicating with the service center communication system, the VCS may transmit the MAC address to allow the service center to determine authorization of the VCS at step 516. If the VCS is unable to communicate with the service center using the WiFi connection, it may continue to communicate with the embedded WiFi system and repeatedly attempt connection upon detection of the service center communication system at step 510.

At step 518, the service center communication system router may receive a list of registered vehicles with at least their associated vehicle identification numbers and MAC addresses, and then compare that list to the present vehicle VCS that was detected by the router to determine vehicle recognition. The list of registered vehicles may also include a fleet of loaner vehicles that the service center may use to allow customers temporary use while their vehicle is getting serviced. If the router confirms the present vehicle MAC address matches one on the list as a loaner vehicle, the service communication system may transmit the service instructions and a user keypad reset code associated with that loaner vehicle. The loaner vehicle VCS may receive the service instructions and reset user keypad code task from the service department at step 520. If the VCS MAC address is not recognized by the service router, then the service communication system may end communication with the vehicle wireless device at step 528.

At step 522, the loaner vehicle VCS may transmit the received dealership instructions and rest user keypad code to the appropriate subsystems in communication with the vehicle system. The loaner vehicle reset user keypad code may be sent by Controller Area Network (CAN) Bus to the appropriate subsystem allowing the keypad code to be reset and assigned with a new authorization code. The reset of the keypad code may prevent a previous user to gain access into a loaner vehicle while ensuring security and limited interface with service center personal.

In one embodiment, the loaner vehicle may be detected by the service communication system as being returned. The loaner vehicle VCS may transmit data to the service center including, but not limited to, mileage, fuel level, and/or if any diagnostics set during the loan period. Based on the transmitted data, the service center may instruct the vehicle occupant using WiFi communication to the VCS certain instructions while sending an alert message to a service attendant to inspect the loaner vehicle.

The loaner vehicle service instructions may communicate to the vehicle occupant a number of return instruction(s) messages including, but not limited to, where to return the loaner vehicle, a reminder that a full tank of gas is need before returning vehicle, and to check the vehicle cabin before exiting the vehicle to make sure all personal belongings are picked up. The loaner vehicle service instruction message may be delivered to other devices paired with the vehicle including, but not limited to a mobile phone at step 524. In another example, the loaner vehicle service instructions may be sent from the service communication system directly to a mobile device registered with the vehicle. The service instructions may be presented on several systems communicating with a VCS including, but not limited to, an instrument cluster, center console LCD screen and/or over the audio speakers in the vehicle at step 526. Upon the customer exiting the vehicle the VCS may end communication with the embedded WiFi system and the service center communication system at step 528.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a vehicle processor communicating with an in-vehicle display and configured to,
in response to detection of a signal associated with a service center communication system (SCCS), transmit a media access control (MAC) address to the SCCS,
receive data from the SCCS including service instructions relating to vehicle drop-off directions and loaner vehicle information based on the MAC address matching a service-appointment-associated MAC address, and
present the service instructions on the in-vehicle display.

2. The system of claim 1 further comprising a wireless transceiver in communication with the vehicle processor and configured to communicate with the SCCS via a handheld mobile device paired to the vehicle processor.

3. The system of claim 2 wherein the wireless communication with the handheld mobile device includes Bluetooth technology.

4. The system of claim 1 wherein the service instructions include an overview of scheduled maintenance and service.

5. The system of claim 1 wherein the in-vehicle display includes vehicle speakers.

6. The system of claim 1 wherein the loaner vehicle information includes a keypad code allowing access to a loaner vehicle.

7. The system of claim 1 wherein the output device includes an LCD screen.

8. The system of claim 1 wherein the at least one processor is additionally configured to:
receive a keypad reset code from the SCCS if the MAC address is recognized as a loaner vehicle.

9. A dealership system comprising:
a dealership processor configured to:
receive input defining service instructions including a first media access control (MAC) address associated with a specific vehicle;
generate vehicle drop-off directions and vehicle loaner information based on the service instructions;
receive a second MAC address from a vehicle present for service;

identify the vehicle present based on a comparison between the first and second MAC addresses; and transmit service instructions to the identified vehicle present.

10. The system of claim 9 wherein the dealership processor is further configured to communicate with a vehicle computing system from the vehicle present via a transceiver.

11. The system of claim 9 wherein the dealership system processor is additionally configured to:

determine an arrival of a loaner vehicle based on the second MAC address; and transmit to the loaner vehicle a keypad reset code and return instructions.

12. The system of claim 11 wherein the keypad reset code includes a new authorization code for the loaner vehicle.

13. The system of claim 11 wherein the return instructions include messages to clean up personal belongings out of the loaner vehicle.

14. A vehicle service instruction method comprising:

establishing wireless communication with a service center communication system (SCCS) through a transceiver in response to a SCCS signal detection;

transmitting a media access control (MAC) address to the SCCS;

receiving data from the SCCS including service instructions relating to vehicle drop-off directions and loaner vehicle information based on the MAC address matching a service-appointment-associated MAC address; and presenting the service instructions on a vehicle output device.

15. The method of claim 14 wherein the wireless communication includes WiFi.

16. The method of claim 14 wherein the service instructions include an overview of scheduled maintenance and service.

17. The method of claim 14 wherein the vehicle output device includes vehicle speakers.

* * * * *